US006869716B2

(12) United States Patent
Neutzler (10) Patent No.: US 6,869,716 B2
(45) Date of Patent: Mar. 22, 2005

(54) FLOW THROUGH GAS SEPARATOR

(75) Inventor: Jay K. Neutzler, Palm Beach Gardens, FL (US)

(73) Assignee: MTI Microfuel Cells Inc., Albany, NY (US)

( * ) Notice: Subject to any disclaimer, the term of this patent is extended or adjusted under 35 U.S.C. 154(b) by 705 days.

(21) Appl. No.: 09/881,477

(22) Filed: Jun. 14, 2001

(65) Prior Publication Data

US 2002/0192525 A1 Dec. 19, 2002

(51) Int. Cl.[7] ................................ H01M 8/02
(52) U.S. Cl. .......................... 429/34; 429/38; 429/39
(58) Field of Search .................. 429/12, 13, 17, 429/30, 35, 36, 37, 38, 39

(56) References Cited

U.S. PATENT DOCUMENTS

| | | |
|---|---|---|
| 4,593,534 A | 6/1986 | Bloomfield |
| 4,673,624 A | 6/1987 | Hockaday |
| 4,810,597 A | 3/1989 | Kumagai et al. |
| 5,523,177 A | 6/1996 | Kosek et al. |
| 5,573,866 A | 11/1996 | Van Dine et al. |
| 5,599,638 A | 2/1997 | Surampudi et al. |
| 5,631,099 A | 5/1997 | Hockaday |
| 5,723,228 A | 3/1998 | Okamoto |
| 5,759,712 A | 6/1998 | Hockaday |
| 5,766,786 A | 6/1998 | Fleck et al. |
| 5,773,162 A | 6/1998 | Surampudi et al. |
| 5,795,668 A | 8/1998 | Banerjee |
| 5,916,699 A | 6/1999 | Thomas et al. |
| 5,945,231 A | 8/1999 | Narayanan |
| 5,992,008 A | 11/1999 | Kindler |
| 6,296,964 B1 | 10/2001 | Ren et al. |

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering, date unknown.
"Polymer Electrolyte Fuel Cells as Potential Power Sources for Portable Electronic Devices", Shinshon Gottesfeld and Mahlon S. Wilson, pp. 486–517, date unknown.

*Primary Examiner*—Frankie L. Stinson
*Assistant Examiner*—Monique Wills
(74) *Attorney, Agent, or Firm*—Cesari and McKenna, LLP (57) ABSTRACT

A flow through gas separation apparatus for a direct oxidation fuel cell system that incorporates a porous hydrophobic conduit having and inlet end through which anodic effluent flows is provided. Backpressure created at an outlet end of the conduit allows the carbon dioxide gas of the effluent to be driven through the porous openings of the conduit while un-reacted fuel and water mixture ultimately exits the flow through gas separation apparatus for re-circulation. The gas separation apparatus operates at ambient pressure and independent of orientation of the device with which it is used.

19 Claims, 5 Drawing Sheets

FLOW THROUGH GAS SEPARATOR

BACKGROUND OF THE INVENTION

1. Field of the Invention

The present invention relates generally to the field of direct oxidation fuel cells and, more particularly, to a flow through gas separator for separating out and directing the flow of gases produced in the reactions in the fuel cell.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel cell systems may be divided into "reformer-based" systems (i.e., those in which the fuel is processed in some fashion to extract hydrogen from the fuel before it is introduced into the fuel cell) or "direct oxidation" systems in which the fuel is fed directly into the cell without the need for separate internal processing. Most currently available fuel cells are reformer-based fuel cell systems. However, because fuel-processing is expensive and requires significant volume, reformer based systems are presently limted to to comparatively high power applications.

Direct oxidation fuel cell systems may be better suited for a number of applications in smaller mobile devices (e.g., mobile phones, handheld and laptop computers), as well as in some larger applications. Typically, in direct oxidation fuel cells, a carbonaceous liquid fuel in an aqueous solution (typically aqueous methanol) is applied to the anode face of a membrane electrode assembly (MEA). The MEA contains a protonically-conductive but, electronically non-conductive membrane (PCM). Typically, a catalyst which enables direct oxidation of the fuel on the anode is disposed on the surface of the PCM (or is otherwise present in the anode chamber of the fuel cell). Protons (from hydrogen found in the fuel and water molecules found on the anodic face of the reaction) are separated from the electrons. The protons migrate through the PCM, which is impermeable to the electrons. The electrons thus seek a different path to reunite with the protons and Oxygen molecules involved in the cathodic reaction and travel through a load, providing electrical power.

One example of a direct oxidation fuel cell system is a direct methanol fuel cell system or DMFC system. In a DMFC system, methanol in an aqueous solution is used as fuel (the "fuel mixture"), and oxygen, preferably from ambient air, is used as the oxidizing agent. There are two fundamental reactions that occur in a DMFC which allow a DMFC system to provide electricity to power consuming devices: the anodic disassociation of the methanol and water fuel mixture into $CO_2$, protons, and electrons; and the cathodic combination of protons, electrons and oxygen into water.

As noted, the DMFC produces carbon dioxide as a result of the reaction at the anode. This carbon dioxide is separated from the remaining methanol fuel mixture before such fuel is re-circulated. Carbon dioxide may be treated as waste, and removed from the system, or used to perform work within the DMFC system before it is vented or otherwise removed. For example, and not by way of limitation, the carbon dioxide gas can be used to passively pump liquid methanol into the fuel cell. This is disclosed in U.S. patent application Ser. No. 09/717,754, filed on Nov. 21, 2000, for a PASSIVELY PUMPED LIQUID FEED FUEL CELL SYSTEM, which is commonly owned by the assignee of the present invention, and which is incorporated by reference herein in its entirety. Another method of utilizing the carbon dioxide is described in U.S. patent application Ser. No. 09/837,831, filed on Apr. 18, 2001, for a METHOD AND APPARATUS FOR CO2-DRIVEN AIR MANAGEMENT FOR A DIRECT OXIDATION FUEL CELL SYSTEM, which discloses a method of using carbon dioxide to actively draw more air to the cathode face of the protonically conductive membrane, thus ensuring that sufficient oxygen is available to continue the cathodic reaction as necessary, and to minimize energy loss from Oxygen transportation.

Fuel cells and fuel cell systems have been the subject of intensified recent development because of their ability to efficiently convert the energy in carbonaceous fuels into electric power while emitting comparatively few environmentally harmful substances. The adaptation of fuel cell systems to mobile uses, however, is not straight-forward because of the technical difficulties associated with reforming most carbonaceous fuels in a simple, cost-effective manner, and within acceptable form factors and volume limits. Further, a safe and efficient storage means for substantially pure hydrogen (which is a gas under the relevant operating conditions), presents a challenge because hydrogen gas must be stored at high pressure and at cryogenic temperatures or in heavy absorption matrices in order to achieve useful energy densities. It has been found, however, that a compact means for storing hydrogen is in a hydrogen rich compound with relatively weak chemical bonds, such as methanol or an aqueous methanol solution (and to a lesser extent, ethanol, propane, butane and other carbonaceous liquids or aqueous solutions thereof). Efforts to develop DMFC systems commercially have increased over the past several years.

In particular DMFCs are being developed for commercial production for use in portable electronic devices. Thus, the DMFC system, including the fuel cell, and the components must be fabricated using materials that not only optimize the electricity-generating reactions, but which are also cost effective. Furthermore, the manufacturing process associated with those materials should not be prohibitive in terms of labor intensity cost.

Typical DMFC systems include a fuel source, fluid and effluent management systems, and a direct methanol fuel cell ("fuel cell"). The fuel cell typically consists of a housing, anode and cathode flow field plates, anode and cathode diffusion layers, and a membrane electrode assembly ("MEA") disposed within the housing.

A typical MEA includes a centrally disposed protonically conductive, electronically non-conductive membrane ("PCM"). The membrane is typically coated on each face with an electrocatalyst such as platinum, or platinum/ruthenium mixtures or alloy particles. On either face of the catalyst coated PCM, the electrode assembly typically includes a diffusion layer. The diffusion layer functions to evenly distribute the liquid fuel across the anode in the case of the fuel or the gaseous oxygen across the cathode face of the PCM in the case of the oxygen. In addition, flow field plates are often placed on the surface of the diffusion layers which are not in contact with the coated PCM. The flow field plates function to provide mass transport of the reactants and by products of the electrochemical reactions, and act to collect and conduct electrons through the load.

As noted, the DMFC produces carbon dioxide as a result of the anodic reaction at the anode. If carbon dioxide is allowed to accumulate, the pressure within the DMFC system may cause the system to fail mechanically. It is well known in the art that anodically evolved carbon dioxide must be removed from the system. Alternatively, this carbon dioxide can be used to drive other aspects of the system. However, in order for it to be used, the carbon dioxide be separated from the remaining, unreacted methanol fuel mixture before such fuel is re-circulated.

It has been known to provide a gas separator to remove the $CO_2$ from the anodic effluent of a liquid feed direct oxidation fuel cell. However, presently available gas separators suitable for use in DMFC systems are membrane-based or mechanical in nature, and may be difficult to incorporate into present designs or within desirable form factors. The membrane-based devices require pressures greater than those found within a DMFC system to operate effectively. Mechanical gas separators may only function effectively in a single orientation with respect to gravity, and thus may not be suitable for use in portable electronics and other electronic tools that need a certain level of orientation independence.

There remains a need, therefore, for a gas separator for use with a liquid feed, direct oxidation fuel cell that does not require high pressures for its operation, and that is orientation independent.

It is thus an object of the present invention to provide an apparatus that separates anodically-produced $CO_2$ from anodic effluent in a direct oxidation fuel cell. It is another object of the invention to provide a gas separation device that allows for capture of the anodically-separated $CO_2$ so that it can be used for other purposes within in the cell. It is a further object of the invention to allow un-reacted aqueous methanol, for example, to be re-circulated in the cell.

It is yet a further object of the invention that we provide a fuel cell, having a gas separation device, that operates effectively independent of its physical orientation. It is a further object of the invention to provide a gas separation device that can operate without the necessity of high pressure conditions.

SUMMARY OF THE INVENTION

The present invention is a flow through gas separation apparatus for a direct oxidation fuel cell system that incorporates a porous hydrophobic conduit having an inlet end into which anodic effluent flows. The surface tension created by the hydrophobic material retains the fuel mixture in the hydrophobic conduit, while backpressure, whether created by the aspect ratio of the hydrophobic conduit or which is created as the fuel mixture passes through a hydrophilic passageway, causes the carbon dioxide gas of the effluent to be driven through the porous openings of the conduit while un-reacted fuel and water mixture remains in the gas separator, and ultimately exits the flow through gas separation apparatus for re-circulation. The gas separation apparatus operates at ambient pressure and independent of orientation of the device with which it is used.

A number of embodiments of the invention are described herein, each which are suited for particular applications. For example, in accordance with one embodiment of the invention, the inlet end of the gas separator may be in direct communication with the DMFC system, possibly near a pump which recirculates the unreacted aqueous fuel solution to the DMFC. In such a case, the conduit may be bent in a U-shape or other desired configuration in order to make the appropriate connections within the fuel cell system. Alternatively, the gas separation apparatus may incorporate a conduit having a coiled configuration to both provide a tortuous path, to create slight backpressure, and a high surface area which aides in the amount of carbon dioxide recovered from the anode effluent while consuming a small volume. The form factors involved in certain devices may allow only a small space for the gas separation apparatus.

A conical-shaped embodiment can reduce volume while increasing lateral pressure to remove additional carbon dioxide, as may be desirable in a particular application. A T-junction or tube-in-tube assembly could also be used to direct the CO2 flow towards another component in which it is to be recycled in a particular manner within the direct oxidation fuel cell system. It is further possible to arrange a series of such gas separators in series within a conduit in a DMFC system.

In addition, it is possible to coat at least a portion of the gas separator with a catalyst to oxidize any extraneous methanol vapor before it is released to the ambient environment.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
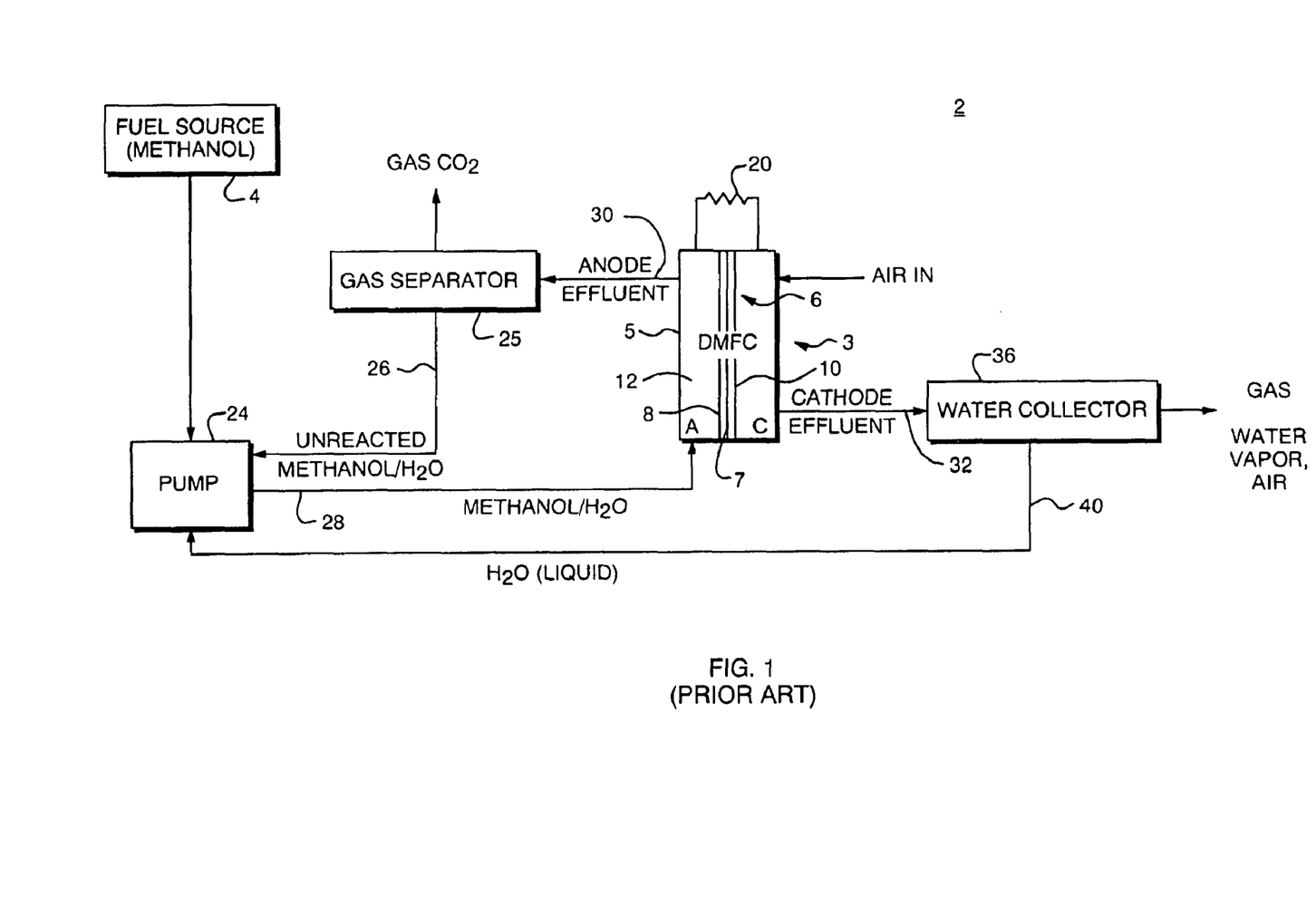
FIG. 1 is a schematic block diagram of the direct oxidation fuel cell system with which the gas separation apparatus of the present invention may be employed.

For a better understanding of the present invention, a system with which the gas separator of the present invention may be utilized will be described. FIG. 1 illustrates a direct oxidation fuel cell system 2. The fuel cell system 2 includes a direct oxidation fuel cell, which may be a direct methanol fuel cell 3 ("DMFC"), for example. For purposes of illustration we herein describe an illustrative embodiment of the invention with DMFC 3, with the fuel substance being methanol or an aqueous methanol solution. It should be understood, however, that it is within the scope of the present invention can be readily used with other fuels, and other direct oxidation fuel cells that utilize other fuels. Thus, as used herein, the word "fuel" shall include methanol, ethanol, propane, butane or combinations thereof and aqueous solutions thereof, and other carbonaceous fuels amenable to use in direct oxidation fuel cell systems.

The system 2, including the DMFC 3, has a fuel delivery system from fuel source 4. The DMFC 3 includes a housing 5 that encloses a membrane electrode assembly 6 (MEA).

MEA 6 is constituted from a protonically conductive, but electronically nonconductive membrane (PCM) 7 which may, for example be comprised of NAFION (a registered trademark of E.I. DuPont de Nemours and Co.). The membrane electrolyte has an anode face 8 and cathode face 10, and is disposed in such a fashion as to separate the anode and cathode chambers within the DMFC housing 5. The portion of DMFC 3 defined on the anode side is referred to herein as the anode chamber 12. The portion of DMFC 3 defined on the cathode side is referred to herein as the cathode chamber 14. The anode 8 and cathode 10 are coated with an appropriate catalyst layer, typically platinum or a blend of platinum or ruthenium. A diffusion layer is then typically used on either side of the MEA, the diffusion layer is typically fabricated from carbon paper or carbon cloth. The DMFC 3 may also include flow field plates (not shown in FIG. 1), which serve to assist in the mass transport of the reactants and by products, and which may act as electrodes across which a load 20 is connected.

As will be understood by those skilled in the art, electricity-generating reactions occur when the fuel substance is introduced to the anode face of the PCM in the presence of a catalyst, while oxygen, preferably in the form of ambient air, is available in the presence of a catalyst at the cathode face of the PCM. Specifically, an aqueous methanol solution or other carbonaceous fuel from fuel source 4 is delivered by pump 24 to the anode chamber 12 of the DMFC 3. The fuel mixture may pass through the channels positioned on the flow field plate, and pass through the diffusion layer, at which point it is introduced to the PCM, in the presence of catalysts on the membrane surface (or which are otherwise present) to enable direct oxidation of the fuel mixture on the anode 8 of the DMFC 3. This separates the hydrogen protons and electrons from the fuel and water molecules. Upon the closing of a circuit, the protons pass through the PCM, which does not conduct electrons. Because the PCM is nonconductive to electrons, the free electrons thus seek a different path to reunite with the protons, and thus travel through load 20, providing electrical power. So long as the reactions continue, a current is maintained through the external circuit's load 20. Direct oxidation fuel cells produce water $H_2O$, but also carbon dioxide $CO_2$ from the reaction, because of the presence of carbon in the original fuel.

The overall electrochemical processes of a DMFC are as follows:

Anode: $CH_3OH+H_2O=CO_2+6H^++6e^-$     Equation 1

Cathode: $6H^++6e^-+O_2=3H_2O$     Equation 2

Net Process: $CH_3OH+3/2\ O_2=CO_2+2H_2O$     Equation 3

The anodically evolved carbon dioxide is in gaseous form, and must be separated from the anodically-produced effluent solution, which is composed of un-reacted methanol and water and $CO_2$. This is done using the gas separator 25 of the present invention. Carbon dioxide is separated from the anodic effluent and is vented or captured for use within the system. If the carbon dioxide is not vented or otherwise removed, pressure will build up within the system, which may compromise the system if left unchecked. Optimal DMFC performance will result if substantially all of the carbon dioxide is removed from the anodic effluent solution.

After the carbon dioxide is separated from the anodic effluent, the un-reacted methanol and water solution is re-circulated to the anode chamber 12 of the DMFC 3 for reaction, via pump 24 (where addition fuel and/or water may be added to replenish the fuel mixture), liquid effluent conduit 26 and fuel mixture conduit 28. Similarly the cathode effluent is removed from the cathode chamber 14 as depicted by cathode effluent conduit 32. Cathode effluent is passed through a water collector 36 or other device that allows for the collection of water from the cathode effluent, and cathodically generated water is re-circulated, via water return conduit 40.

Figure 2:
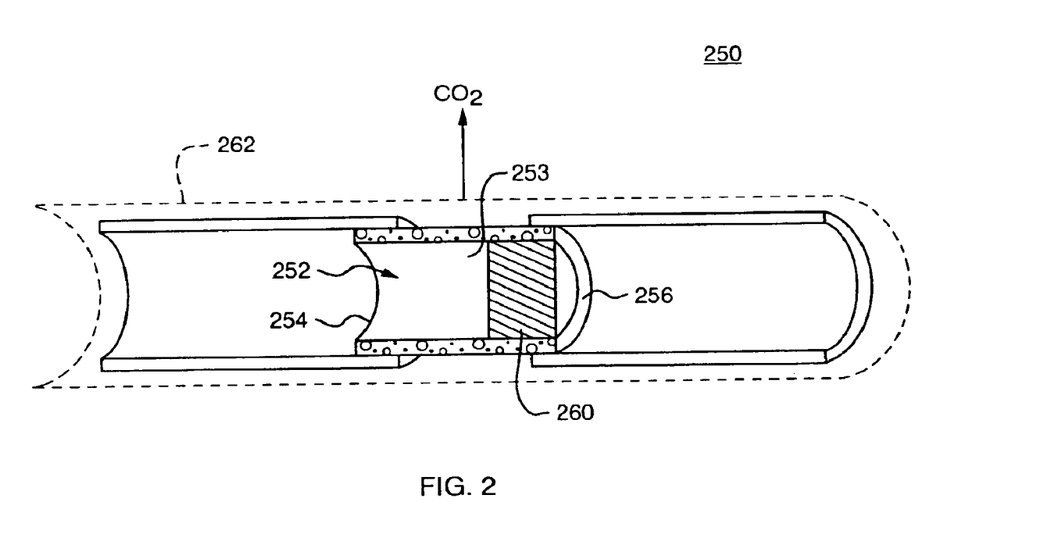
FIG. 2 is a schematic cross section of one embodiment of the gas separation apparatus of the present invention.

A flow through gas separator in accordance with the present invention is illustrated and described in greater detail in FIG. 2. The gas separator 250, which is also referred to herein as a gas separation apparatus, includes a conduit component 252 comprised substantially of a porous hydrophobic material. This material may be, but is not limited to, sintered or expanded Teflon or PTFE. In addition, the walls 253 of the conduit component 252 are porous, and thus create a path for gas to escape through the walls of the conduit component 252. Liquid effluent will not be able to escape, due to the hydrophobic nature of the conduit component.

Figure 3:
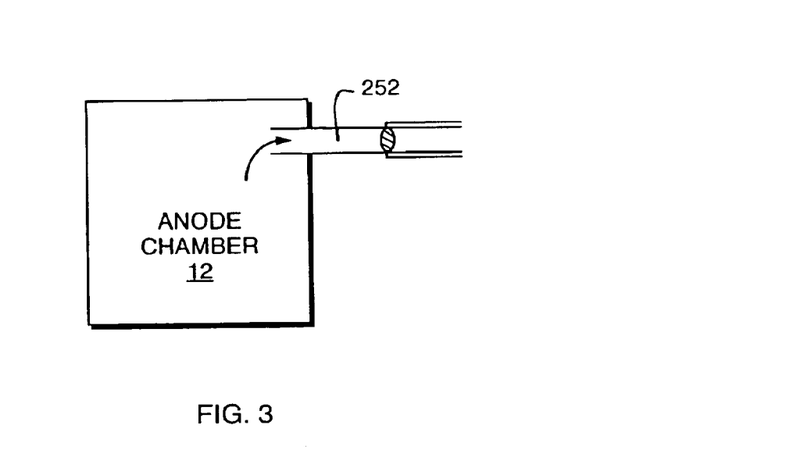
FIG. 3 is a schematic cross section of the coupling of the gas separation apparatus of the present invention with the anode chamber of an associated direct oxidation fuel cell.

The conduit component 252 has a first, generally hollow inlet end 254. (The conduit component is also referred to herein as a "conduit"). The inlet end 254 is coupled with the anode chamber 12 of DMFC 3, as illustrated in FIG. 3. The anode effluent mixture from the anode chamber 12 is introduced into the inlet end 254 of the conduit component 252.

An outlet end 256 is fabricated in a fashion that permits liquid effluent to pass therethrough, albeit slowly enough to create backpressure within the conduit 252. This may be accomplished by treating the outlet end 256 of the conduit 252 in a manner that renders it hydrophilic, or mechanically coupling a hydrophilic component to the outlet end of the conduit 252, thus creating a hydrophilic "passage" within conduit 252. The passage 260 is preferably fabricated from a hydrophilic material, which may include, without limitation, hydrophilic polyethylene. The effluent mixture is attracted to the hydrophilic material.

Alternatively, if the aspect ratio of the conduit 252 is sufficiently small, the hydrophilic component 260 of the outlet end may be eliminated and backpressure may be created due to the surface tension generated by the porous, hydrophobic material. In this instance, the surface tension created will act in a similar fashion as the hydrophilic component, and will similarly cause carbon dioxide to be expelled.

In operation, when anode effluent comprised of unreacted methanol, water, and carbon dioxide, is introduced into inlet end 254 of the gas separator 250, it flows freely from the inlet end 252 towards the outlet end 256. Upon coming into contact with the outlet hydrophilic material, the flow of the anodic effluent is limited, creating backpressure within the gas separator 250. The walls 253 of the conduit component 252 are fabricated substantially of a hydrophobic material, they will not absorb the water in the effluent. This, in combination with the backpressure created by the passage 260 at the outlet end 256, in effect pushes the anode effluent and carbon dioxide gas against the porous hydrophobic material of the walls 253. The liquid effluent of unreacted fuel and water, does not escape via the tortuous path due to the surface tension of the hydrophobic nature of the material. This causes the carbon dioxide gas to be separated out from the effluent mixture as it passes through porous walls 253 of the conduit 252. The liquid portion of the effluent passes through the passage 260, and is recirculated within the DMFC system.

In this manner, the $CO_2$ is separated from the liquid effluent mixture, and is vented (preferably to the external environment) or is captured for other uses within the system 2. The remaining liquid anodic effluent is then recirculated and the fuel and water concentrations in the fuel mixture may be adjusted to provide the DMFC 3 with optimal fuel concentrations. It should be understood that the gas separator 250 of the present invention may be mechanically coupled with the anode chamber 12 as illustrated in FIG. 3, or it may be coupled with a conduit leading from the anode chamber 12, as desired in a particular application.

Those skilled in the art will recognize that hydrophobic porous materials, such as expanded or sintered Teflon or PTFE, are malleable, and easily formed or shaped, and as such may be formed into a virtually infinite number of shapes and configurations. Thus, it is possible to bend, coil, form, or otherwise configure the gas separator in order to provide for orientation independence. It should be further understood that the actual shape of the gas separator components may vary widely from the embodiments illustrated herein: for example, the inlet end may be wider than the outlet end, causing a greater volume of gas to be collected from the anode chamber, as may be desired in a particular application.

Figure 4:
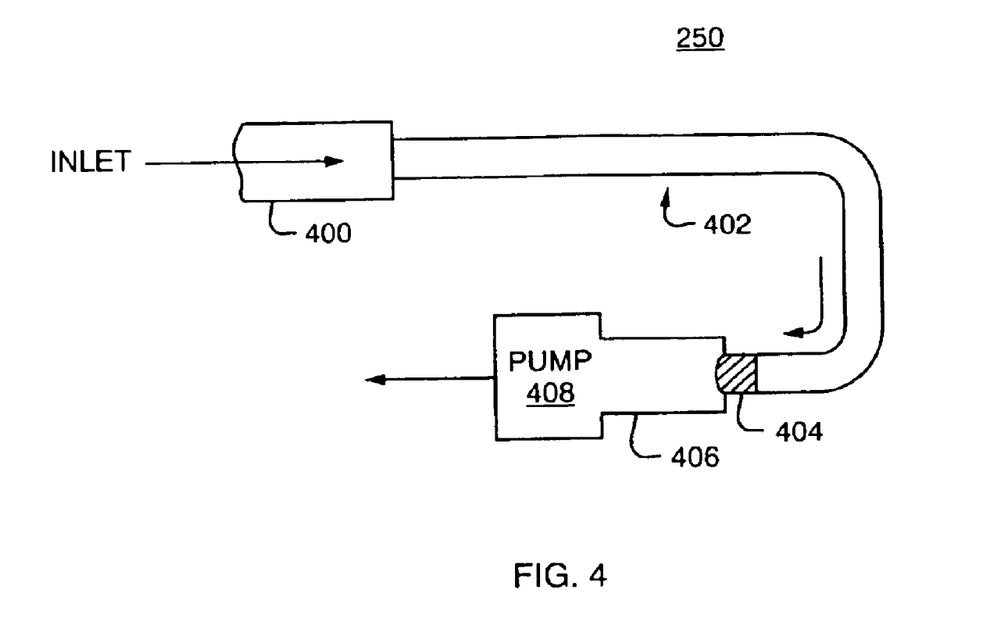
FIG. 4 is a schematic illustration of one embodiment of the present invention with a U-shaped conduit.

FIG. 4 illustrates another embodiment of the flow through gas separator 250 of the present invention. The embodiment of FIG. 4 has inlet portion 400, which leads out of the anode chamber of the fuel cell (not shown in FIG. 4). The inlet portion 400 is coupled with the hydrophobic conduit 402. In the embodiment of FIG. 4, hydrophobic conduit 402 has a U-shape. The U-shape is one example of how the conduit 400 may be shaped to fit a certain application requirement. The U-shape provides design flexibility so that the gas separator 250 may be connected to other fluidic components of the DMFC system that are not contiguous to the fuel cell. The gas separator 250 of the present invention is adaptable so that the conduit 400 may be shaped to conform to the form factors and space constraints of the device in which it is used. The U-shape also provides orientation independence to the gas separation function since the U-shape allows gas to rise in relation to gravity, and escape from conduit 400 in any number of orientations.

Figure 5:
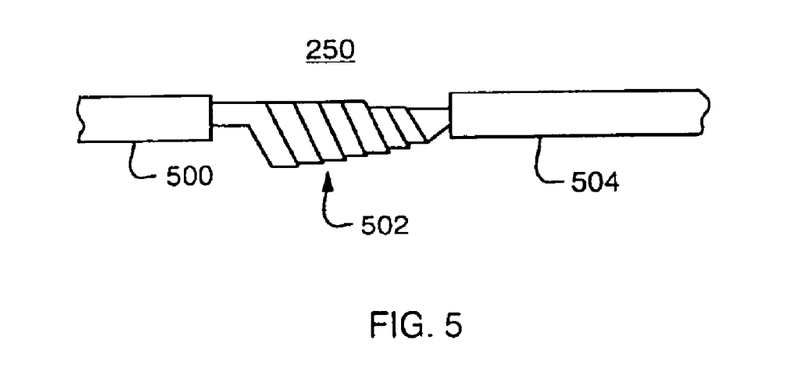
FIG. 5 is a schematic cross section of one embodiment of the present invention with a coiled configuration.

FIG. 5 illustrates another alternative embodiment of the invention in which the gas separator 250 has inlet end 500 coupled with a coiled hydrophobic conduit 502 which is then coupled to outlet end 504. The coiled configuration allows the anode effluent to be exposed to a greater surface area of hydrophobic material, while the gas separator as a whole consumes less space in the electronic component being powered by the cell. This may be of importance in a small, hand held device. The coiled configuration also provides gas separation over a wide range of orientations.

Figure 6:
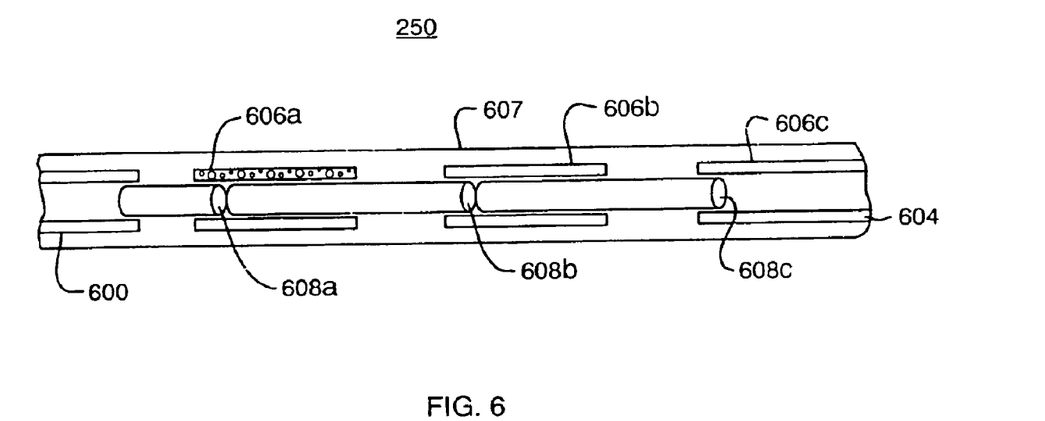
FIG. 6 is a schematic cross section of the series embodiment of the present invention.
Figure 7:
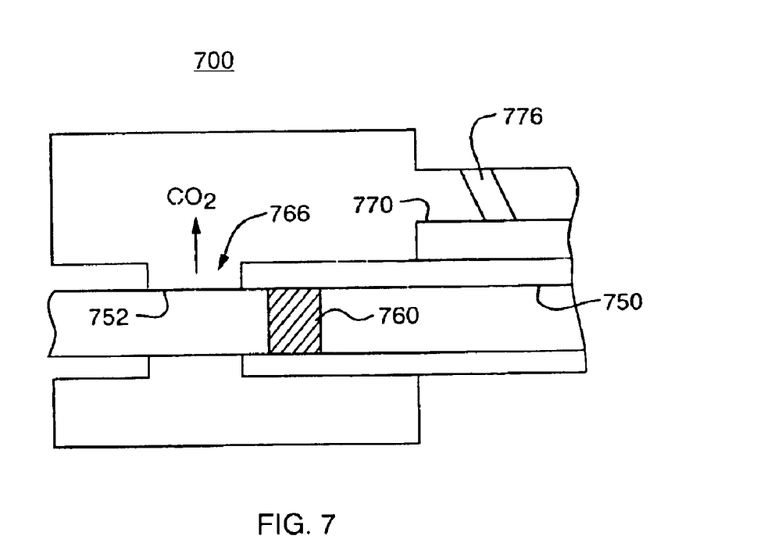
FIG. 7 is a schematic illustration of the T-junction or tube-in-tube embodiment of the present invention.

FIG. 6 illustrates (in exploded view) yet another alternative embodiment of the invention in which a plurality of hydrophobic conduit components 606a, 606b and 606c, for example, are placed along a duct 607. The series of conduits 606a–606c increases the amount of $CO_2$ that can be separated out and recovered from the liquid anode effluent. The outer duct can be fitted with devices to capture the $CO_2$. This is shown with greater particularity in FIG. 7. A junction fitting 700 can be placed at an appropriate location along the duct 607 (FIG. 6), or in other embodiments of the invention. The T-junction fitting 700 or a tube-in-tube fitting (designated in phantom in FIG. 2, reference character 262), is used with a gas separator 750 constructed in accordance with the present invention, and having an inlet end 752, and outlet end 756 with hydrophilic component 760. As carbon dioxide is separated out through the tortuous path of the conduit walls of the gas separator 750, it is directed by T-junction (or tube in-tube) fitting 700 via its opening 766 and ultimately through pipe 770 for capture and release into the environment or re-circulation to another component of the fuel cell system. It should be understood that by encapsulating the gas separator as set forth in any embodiment of this invention, it is possible to capture the evolved carbon dioxide.

Figure 8:
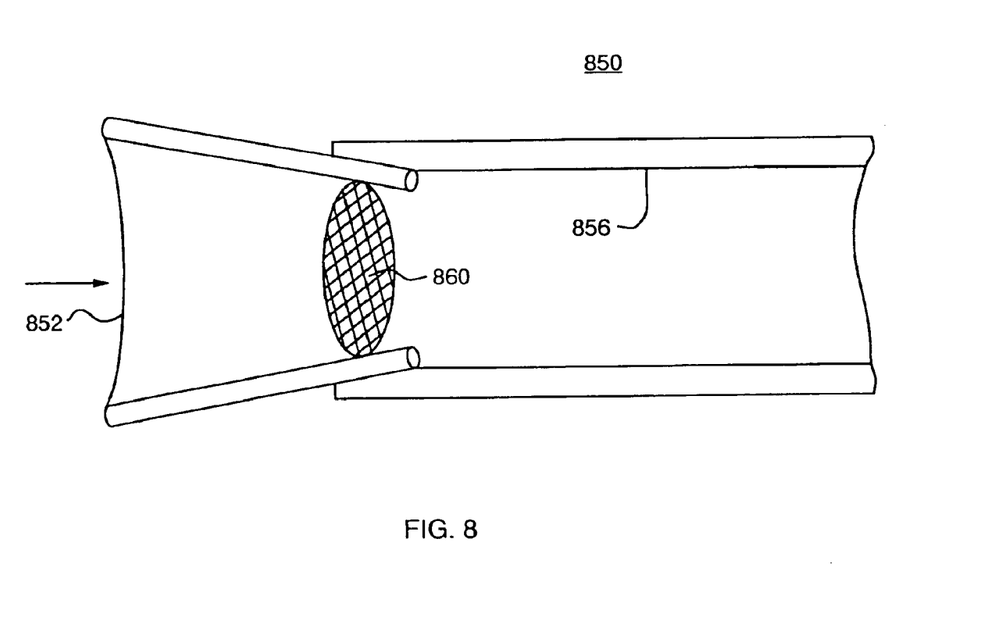
FIG. 8 is a schematic cross section of another embodiment of the present invention in which the outlet end has a conical shape.

FIG. 8 illustrates another embodiment of the invention in which a flow through gas separator 850 has an inlet end 852 and an outlet end 856 with hydrophilic component 860. In this embodiment, the outlet end 856 is conically-shaped. The cone-like shape reduces the volume at the outlet end 856 and in turn increases the pressure within the gas separator 850. This may be desirable in a particular application, depending upon the device with which the gas separator of the present invention is used. This embodiment may also be implemented without the use of hydrophilic component, relying on the surface tension created as well as the narrowing aspect of gas separator 850 to create the necessary back-pressure to cause the gas to separate.

It is a further aspect of the invention to apply a catalyst, such as platinum or a platinum and ruthenium blend, to the surface or such other portion of the gas separator in order to oxidize any extraneous methanol that may escape from the liquid effluent in vapor form, or methanol that is carried with the carbon dioxide vapor in order to avoid the unintended release of methanol into the environment. The catalyst may be applied to the gas separator directly, thus oxidizing any methanol vapor as it is separated from the anode effluent mixture. Alternatively, the methanol vapor may be oxidized following its separation, by coating a high surface area component which is placed in a location which will maximize the opportunity to expose the methanol to a component. One solution is to provide a catalyst coating, such as a coated screen 776 (FIG. 7) along the vent 770 which directs the carbon dioxide out of the gas separator. Contact with the catalyst in the presence of oxygen causes the instantaneous oxidation of any stray methanol vapor It should be further understood that the gas separator of the present invention might be used with a variety of fuel cell designs including planar designs as well as stacked fuel cell assemblies.

What is claimed is:

1. A gas separator assembly for use with a direct oxidation fuel cell that includes a membrane electrode assembly having a protonically-conductive membrane electrolyte, with a catalyst disposed in proximity to the membrane electrolyte, said membrane having an anode face and a cathode face, and an anode chamber being defined within said cell contiguous to said anode and a cathode chamber being defined within said cell contiguous to said cathode, and when a fuel is introduced into the anode chamber, electricity-generating reactions occur in which anodically generated carbon dioxide, electrons and protons are produced and when supplied with oxygen, cathodically-generated water is produced, the gas separator assembly, comprising:

A) an inlet end coupled with said anode chamber to receive anode effluent including unreacted fuel and water and carbon dioxide; and B) a conduit component coupled with said inlet end in to which said anode effluent is conveyed, said conduit having walls comprised substantially of a porous, hydrophobic material, and defining a tortuous path exiting said conduit, whereby carbon dioxide is separated out from said anode effluent.

2. The gas separator assembly as defined in claim 1, further comprising:
an outlet end having a cap member disposed within the outlet end and said cap member having a flow limiting orifice to generate back pressure within said anode effluent traveling in said conduit component, whereby anode effluent under back pressure is pushed against the walls of said conduit and thereby into said tortuous path, the separate out carbon dioxide from said anode effluent.

3. The gas separator assembly as defined in claim 1 further comprising:
capture duct coupled with said conduit component for receiving said carbon dioxide separated from said anode effluent.

4. The gas separator assembly as defined in claim 1 wherein
said conduit component is U-shaped, whereby carbon dioxide is separated from said anode effluent regardless of orientation of said assembly.

5. The gas separator assembly as defined in claim 1 wherein
said conduit component has a bend in it such that it is formed to be coupled with said anode chamber, whereby carbon dioxide is separated from said anode effluent regardless of orientation of said assembly.

6. The gas separator assembly as defined in claim 1 wherein
said conduit component is coiled, wherein carbon dioxide is separated from said anode effluent regardless of orientation of said assembly.

7. The gas separator assembly as defined in claim 1 wherein
said outlet end is tapered to form a cone-like shape, whereby carbon dioxide is separated from said anode effluent regardless of an orientation of said assembly.

8. The gas separator assembly as defined in claim 2 further comprising
at least one of a T-junction fitting and a tube-in-tube fitting coupled to said conduit component to capture said carbon dioxide separated from said anode effluent.

9. The gas separator assembly as defined in claim 1 further comprising:
a plurality of said conduit components placed in series along an associated outer duct, said outer duct having openings therein for release and capture of said carbon dioxide.

10. The gas separator assembly as defined in claim 2 further comprising
a catalyst applied to the exterior aspect of the gas separator assembly for oxidizing any methanol vapor that is separated out of said anode effluent with said carbon dioxide.

11. The gas separator assembly as defined in claim 1 wherein
the gas separator assembly is comprised of a plurality of said fuel cells, each fuel cell having a membrane electrode assembly, and wherein said plurality of fuel cells are connected a planar design.

12. The gas separator assembly as defined in claim 1 wherein
the gas separator assembly is comprised of a plurality of fuel cells, each fuel cell having a membrane assembly, and wherein said plurality of fuel cells are connected in a stacked design.

13. A gas separation apparatus for use with a direct oxidation fuel cell that includes a membrane electrode assembly having a protonically-conductive membrane electrolyte, with a catalyst disposed thereupon, said membrane having an anode face and a cathode face, and an anode chamber being defined within said cell contiguous to said anode and a cathode chamber being defined within said cell contiguous to said cathode, and when a fuel is introduced into the anode chamber, electricity-generating reactions occur in which anodically generated carbon dioxide, electrons and protons are produced and when supplied with oxygen, cathodically-generated water is produced, the gas separator assembly, comprising:

(A) means for introducing anodic effluent from the anode chamber of the fuel cell;
(B) means for conveying anodic effluent from said anode chamber along a hydrophobic, tortuous path;
(C) means for limiting flow out of said conveying means to create backpressure within said conveying means whereby carbon dioxide is separated out from said anode effluent as said anode effluent is conveyed along said hydrophobic tortuous path.

14. The gas separation assembly as defined in claim 13 wherein
said means for conveying is a conduit shaped to conform to an associated fuel cell housing.

15. The gas separation assembly as defined in claim 13 further comprising
means for capturing carbon dioxide separated from said anode effluent.

16. The gas separation assembly as defined in claim 13 wherein
said means for capturing said carbon dioxide includes a T-junction.

17. The gas separation assembly as defined in claim 13 wherein
said means for capturing said carbon dioxide includes a tube-in-tube assembly.

18. A method of separating carbon dioxide from an anode effluent produced in a direct oxidation fuel cell that includes a membrane electrode assembly having a protonically-conductive membrane electrolyte, with a catalyst disposed thereupon, said membrane having an anode face and a cathode face, and an anode chamber being defined within said cell contiguous to said anode and a cathode chamber being defined within said cell contiguous to said cathode, and when a fuel is introduced into the anode chamber, electricity-generating reactions occur in which anodically generated carbon dioxide, electrons and protons are produced and when supplied with oxygen, cathodically-generated water is produced, the gas separator assembly, the method including the steps of:

(A) introducing anodic effluent from the anode chamber of the fuel cell;
(B) conveying anodic effluent from said anode chamber along a hydrophobic, tortuous path;
(C) limiting flow out of said conveying means to create backpressure within said conveying means whereby carbon dioxide is separated out from said anode effluent as said anode effluent is conveyed along said hydrophobic tortuous path.

19. The gas separator assembly as defined in claim 2 wherein
said end cap of said outlet is comprised substantially of hydrophilic materials.

* * * * *